(12) United States Patent
Cobbold et al.

(10) Patent No.: US 10,394,603 B2
(45) Date of Patent: Aug. 27, 2019

(54) VIRTUAL CONTAINER PROCESSING ON HIGH PERFORMANCE COMPUTING PROCESSORS

(71) Applicant: GENBAND US LLC, Plano, TX (US)

(72) Inventors: Mark Temple Cobbold, Stittsville (CA); Francois Caron, Montreal (CA)

(73) Assignee: GENBAND US LLC, Plano, TX (US)

( * ) Notice: Subject to any disclaimer, the term of this patent is extended or adjusted under 35 U.S.C. 154(b) by 90 days.

(21) Appl. No.: 15/663,029

(22) Filed: Jul. 28, 2017

(65) Prior Publication Data

US 2019/0034233 A1    Jan. 31, 2019

(51) Int. Cl.
| | |
|---|---|
| *G06F 9/50* | (2006.01) |
| *G06F 11/20* | (2006.01) |
| *H04L 29/06* | (2006.01) |
| *H04L 29/08* | (2006.01) |
| *G06F 9/455* | (2018.01) |
| *H04L 12/931* | (2013.01) |

(52) U.S. Cl.
CPC .............. *G06F 9/50* (2013.01); *G06F 9/45541* (2013.01); *G06F 11/2097* (2013.01); *H04L 29/06* (2013.01); *H04L 67/1097* (2013.01); *H04L 69/10* (2013.01); *H04L 49/70* (2013.01); *H04L 67/10* (2013.01); *H04L 69/16* (2013.01); *H04L 69/18* (2013.01)

(58) Field of Classification Search
CPC ....................................................... G06F 9/50
See application file for complete search history.

(56) References Cited

U.S. PATENT DOCUMENTS

| | | | | |
|---|---|---|---|---|
| 7,117,250 B1* | 10/2006 | Wu | ............ | G06F 21/10 |
| | | | | 709/217 |
| 2015/0244760 A1* | 8/2015 | Tun | ............ | H04N 21/438 |
| | | | | 709/223 |
| 2016/0041912 A1* | 2/2016 | Nakajima | ............ | G06F 12/0842 |
| | | | | 711/120 |
| 2018/0270165 A1* | 9/2018 | Chen | ............ | H04L 47/822 |
| 2018/0293776 A1* | 10/2018 | Ray | ............ | G06F 9/45558 |

* cited by examiner

*Primary Examiner* — Charlie Sun
(74) *Attorney, Agent, or Firm* — Fogarty LLP

(57) ABSTRACT

A method includes, with a first execution unit of a processor, executing instructions for a processing task on behalf of a first virtual container. The first virtual container is configured to utilize computing resources of the first execution unit without demanding more computing resources than the first execution unit provides. The first execution unit may have exclusive access to a first arithmetic logic unit (ALU). The method further includes, with a second execution unit of the processor, processing instructions for the processing task on behalf of a second virtual container. The second virtual container is configured to utilize computing resources of the first execution unit without demanding more computing resources than the first execution unit provides. The second execution unit may have exclusive access to a second Arithmetic Logic Unit (ALU). The first execution unit and the second execution unit operate in parallel.

17 Claims, 5 Drawing Sheets

VIRTUAL CONTAINER PROCESSING ON HIGH PERFORMANCE COMPUTING PROCESSORS

BACKGROUND

The present disclosure relates generally to high performance computing, and more particularly to methods and systems for performing processing tasks, such as audio transcoding, using multiple virtual containers assigned to specific execution units.

Telecommunication technology often involves large processing tasks on substantial quantities of data. For example, when two users are communicating over a telecommunication system, their voice is captured by a microphone and the data representing speech is formatted in a particular manner. Different components of a telecommunication system may utilize different media formats. Thus, data often is transcoded from one format to another when traversing a telecommunication network. A particular computing system may handle thousands of communication sessions (e.g., phone calls). Thus, transcoding large amounts of audio data can consume a lot of processing resources.

Conventional telecommunication systems rely on proprietary physical equipment. Such equipment includes hardware that is specially designed to handle large transcoding tasks. However, more recent technology utilizes virtual machines running on generic hardware. Such technology includes Network Function Virtualization (NFV). When using NFV and other virtual computing based solutions, it is desirable that the software work with the hardware to increase the efficiency at which the system processes large amounts of data.

SUMMARY

According to one example, a method includes, with a first execution unit of a processor, executing instructions for a processing task on behalf of a first virtual container. The first virtual container is configured to utilize computing resources of the first execution unit without demanding more computing resources than the first execution unit provides. The first execution unit may have exclusive access to a first arithmetic logic unit (ALU). The method further includes, with a second execution unit of the processor, processing instructions for the processing task on behalf of a second virtual container. The second virtual container is configured to utilize computing resources of the first execution unit without demanding more computing resources than the first execution unit provides. The second execution unit may have exclusive access to a second Arithmetic Logic Unit (ALU). The first execution unit and the second execution unit operate in parallel.

According to one example, a method includes, performing a transcoding process with a plurality of virtual containers, the transcoding process converting data in a first format to data in a second format for a plurality of communication sessions. The method further includes assigning each of the virtual containers to a single one of a plurality of execution units of a processor, each execution unit having exclusive access to its own arithmetic logic unit.

According to one example, a system includes a processor having a plurality of independent execution units, each independent execution unit having exclusive access to at least one arithmetic logic unit. The system further includes a memory comprising machine readable instructions that when executed by the processor, cause the system to: perform a transcoding process from a first media format to a second media format, the transcoding process being performed by a plurality of virtual containers, each container assigned to one of the plurality of independent execution units.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, when using NFV and other virtual computing based solutions, it is desirable that the software work with the hardware to increase the efficiency at which the system processes large amounts of data. According to principles described herein, the software for a processing task such as audio transcoding may be structured to be performed by multiple virtual containers, each virtual container including an instance of an application for transcoding. Furthermore, each of these instances may be structured for execution on a single execution unit within a high performance processor. In an example high-performance processor, each execution unit includes its own arithmetic logic unit (ALU) that is not shared with other execution units. Furthermore, the transcoding application may be structured so that it can utilize the full processing resources of an execution unit without consuming more processing resources than what the execution unit is capable of providing. In other words, in some embodiments a particular instance does not require utilization of more than one execution unit.

By having each application instance not use more processing resources than can be provided by a single execution unit, processing overhead can be reduced. Specifically, if an application process utilizes more than one execution unit, then multiple execution units must coordinate the execution of instructions. Accordingly, the overall system performance can be increased by having each application instance limited to a single execution instance.

While the particular description relates to audio transcoding, processing tasks described herein may be used for other types of processing such as video transcoding, encryption, decryption, networking, and other large processing tasks.

Figure 1:
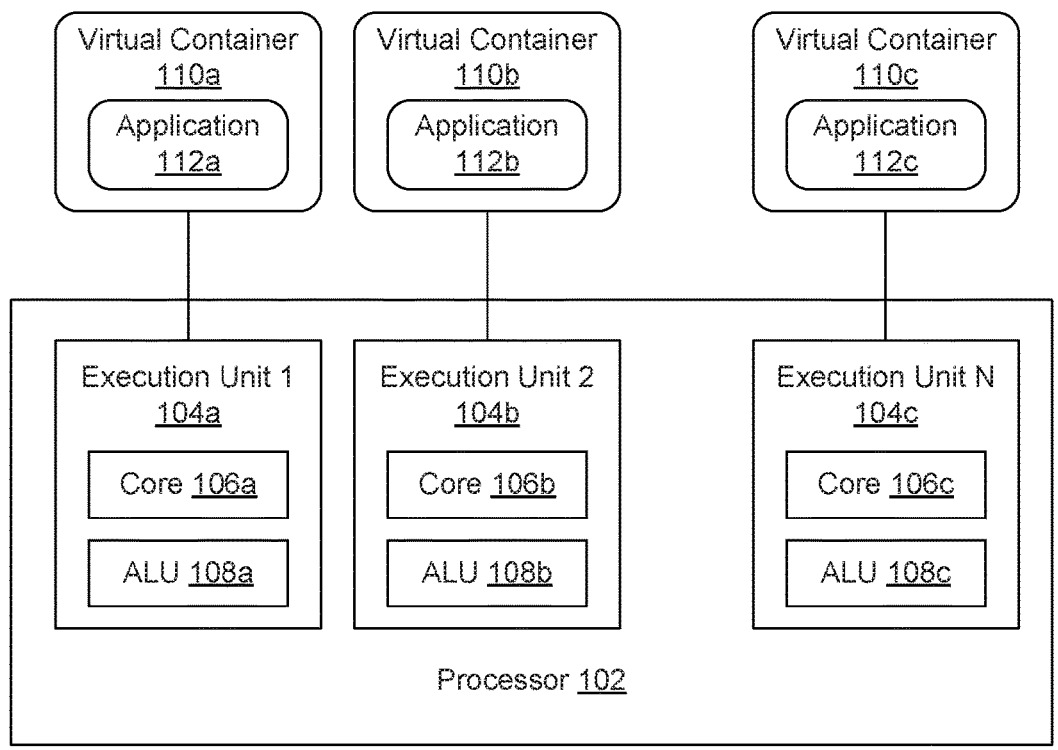
FIG. 1 is a diagram showing separate virtual machine containers running on execution units of a processor, according to one example of principles described herein.

FIG. 1 is a diagram showing example separate virtual machine containers running on execution units of a processor. According to the present example, a processor 102 includes multiple execution units 104a, 104b, 104c. Each execution unit includes its own ALU, which is not used by other execution units. The processor 102 may be a high performance computing processor such as the Intel® Xeon Phi™. Each of the execution units 104 may operate in parallel. In other words, a particularly execution unit 104 may perform transcoding task for one application instance 112 without having to wait on processing tasks on other execution units 104 to complete.

The processor 102 may be a single processor that is formed on a single die. The processor 102 may include multiple execution units 104. An execution unit is part of the processor that performs operations according to machine readable instructions of a computer program. Each execution unit is able to execute instructions independently of other execution units. For example, each execution unit may have its own set of physical systems such as processor registers, an Arithmetic Logic Unit (ALU), an Address Generation Unit (AGU), a Floating Point Unit (FPU), a Load-Store Unit (LSU) or other components. In some examples, each execution unit 104 includes at least one core 106 and at least one ALU 108. In one example, the processor 102 may include more than 50 execution units.

Each processing core 106 is capable of fetching instructions, generally from a processor cache. The processing core 106 also decodes such instructions. Specifically, the core identifies the opcode portion of the instruction so that it can act accordingly. Then, the core executes the instruction. Some examples of instructions include "branch" or "move data" instructions. In some examples, if executing the instruction involves arithmetic (e.g., add or increment) or bitwise operations (e.g., AND, OR, etc.), then the core uses the ALU 108 to execute such an instruction.

In the present example, each execution unit 104 of the processor 102 has its own ALU. Thus, it does not have to wait on the ALU to perform tasks on behalf of other execution units. Each ALU includes a collection of logic gates that are used to perform arithmetic and bitwise operations on binary data. Typically the ALU takes two operands from two processor registers and performs an operation on those operands. Then, the ALU places the output of the operation into another processor register. In some examples, multiple cores in a single execution unit 104 may share the one or more ALUs within that execution unit 104. Each ALU 108 may have vector processing abilities. In other words, the ALU 108 may execute instructions that manipulate an array of data points instead of a single data point. For example, a particular processor instruction may be to subtract the elements of one vector from the corresponding elements of another vector and place the results in a destination vector. Such processing is particularly useful for speech transcoding in which similar operations are performed on large sets of data. Thus, vector processing allows for more efficient transcoding.

The processor may be designed to have Multiple Instruction, Multiple Data (MIMD) capabilities. In other words, the processor may use its multiple cores to execute multiple instructions on multiple pieces of data asynchronously and independently. Thus, several processing tasks can be performed in parallel. Therefore, when using the processor to transcode audio data, several different execution units can operate independently to transcode different speech frames.

The transcoding process (or other processing task) can be performed by a series of instructions, referred to as an application or program. The transcoding application may be designed to efficiently utilize a processor such as processor 102. In the present example, the processing task is performed by multiple instances of a single application. Specifically, the application may run in an environment that utilizes multiple virtual containers. Each virtual container 110 may be, for example, a virtual machine. In some examples, each virtual container runs an identical instance of the processing application 112. For example, the processing application may be an audio transcoding application.

In the present example, each virtual container is assigned to one execution unit. Thus, only one particular execution unit 104 provides service to one particular virtual container 110 in the example of FIG. 1. For example, virtual container 110a is assigned to execution unit 104a. Virtual container 110b is assigned to execution unit 104b. Virtual container 110c is assigned to execution unit 104c. Thus, the application instance 112a is processed on core 106a and ALU 108a. Application instance 112b is processed on core 106b and ALU 108b. Application instance 112c is processed on core 106c and ALU 108c. In other words, processing tasks for virtual container 110a are only executed on execution unit 104a and not on any other execution unit. Similarly, processing tasks for virtual container 110b are executed on execution unit 104b and not on any other execution unit. By assigning virtual containers to execution units in such a manner, the high performance computing processor 102 can be utilized to perform processing tasks, such as audio transcoding, more efficiently.

The application instances 112 may be designed such that they do not consume more processing resources than can be provided by a single execution unit. In other words, execution of the application instance 112 will not utilize more than one execution unit. That way, there is less overhead used to manage the coordination between two separate execution units. This leads to an overall increase in system performance. Moreover, the application instances 112 may be designed to fully utilize the processing capabilities of a single execution unit.

In other words, if all the application instances are using about 70% of the capacity of their respective execution units, and each execution unit on the processor 102 is being used, then only 70% of the processor's 102 full capability is being used. Conversely, if 100% or close to 100% of each execution unit's 104 processing capability is being used, then 100% or close to 100% of the processor's 102 capability is being used.

In some examples, a particular execution unit 104 may have more than one core 106. Additionally, a particular execution unit 104 may have more than one ALU 108. In such cases, the application instances 112 can be designed fully utilize, yet not demand more than, the capabilities provided by the number of cores and ALUs of a particular execution unit.

Figure 2:
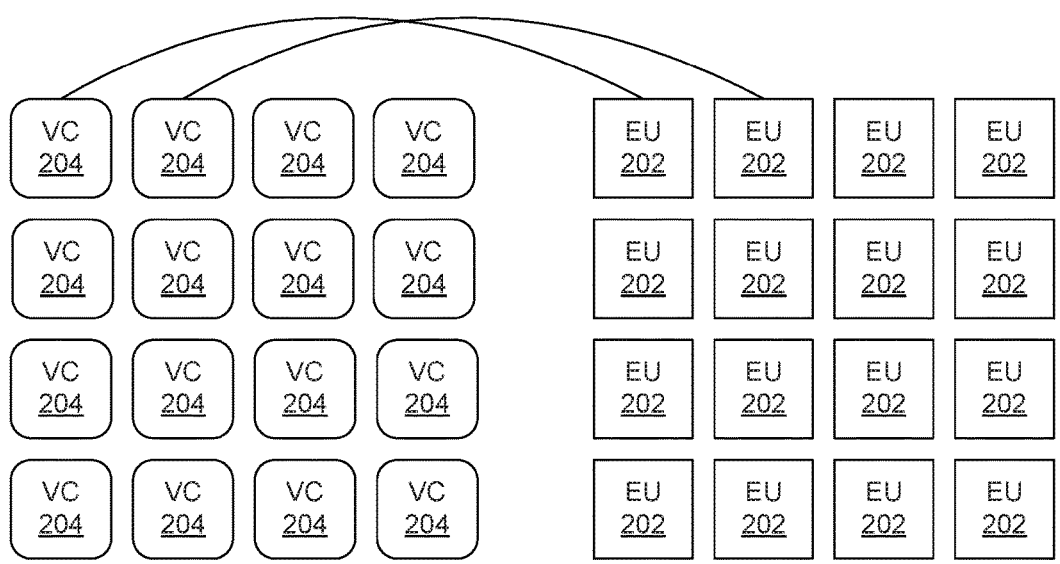
FIG. 2 is a diagram showing 16 virtual containers associated with 16 execution units, according to one example of principles described herein.

FIG. 2 is a diagram showing 16 example virtual containers 204 associated with 16 execution units 202. In this example, each of the 16 virtual containers 204 is assigned to one of the executions units. While only 16 virtual containers are shown, other embodiments may involve a much larger number of virtual containers. In some cases, the software may be designed to not create more instances than can be handled by a particular processor. Thus, in the present example, the processing application (e.g., transcoding application) creates no more than 16 instances, or 16 virtual containers.

In some examples, if more virtual containers are needed than a single processor (e.g. 102, FIG. 1) can handle, then additional computing devices may be used, each of the additional computing devices having their own processor like processor 102. In other words, if 70 application instances are needed to meet current demand, and there are only 50 execution units on the processor 102, then 20 execution units of an additional processor like processor 102 may be used.

In some examples, a particular operating system, such as Linux, may run multiple instances of a single application. In such case, each virtual container 204 may be a different instance of that application. Each instance of the application can be bound to a specific execution unit such that the instance has exclusive access to that execution unit 202. More specifically, the code for the application can be designed in such a way that it works with the operating system to assign each instance to a particular execution unit 202 of the processor 102.

In some examples, the application associated with the virtual containers 204 (e.g., a transcoding application) may have an analytics component. The analytics component may collect statistics on the processing tasks performed by the application. The analytics component may include the software and the hardware for collecting and storing data related to the performance of the application. In the example of the transcoding application, the analytics component may collect data related to, for example, how many speech frames are processed per second or per millisecond. Such data may be used to optimize performance of the transcoding application. For example, the data could be used for code optimization, transcoding quality, codec optimization, voice quality, throughput and performance optimization.

Figure 3:
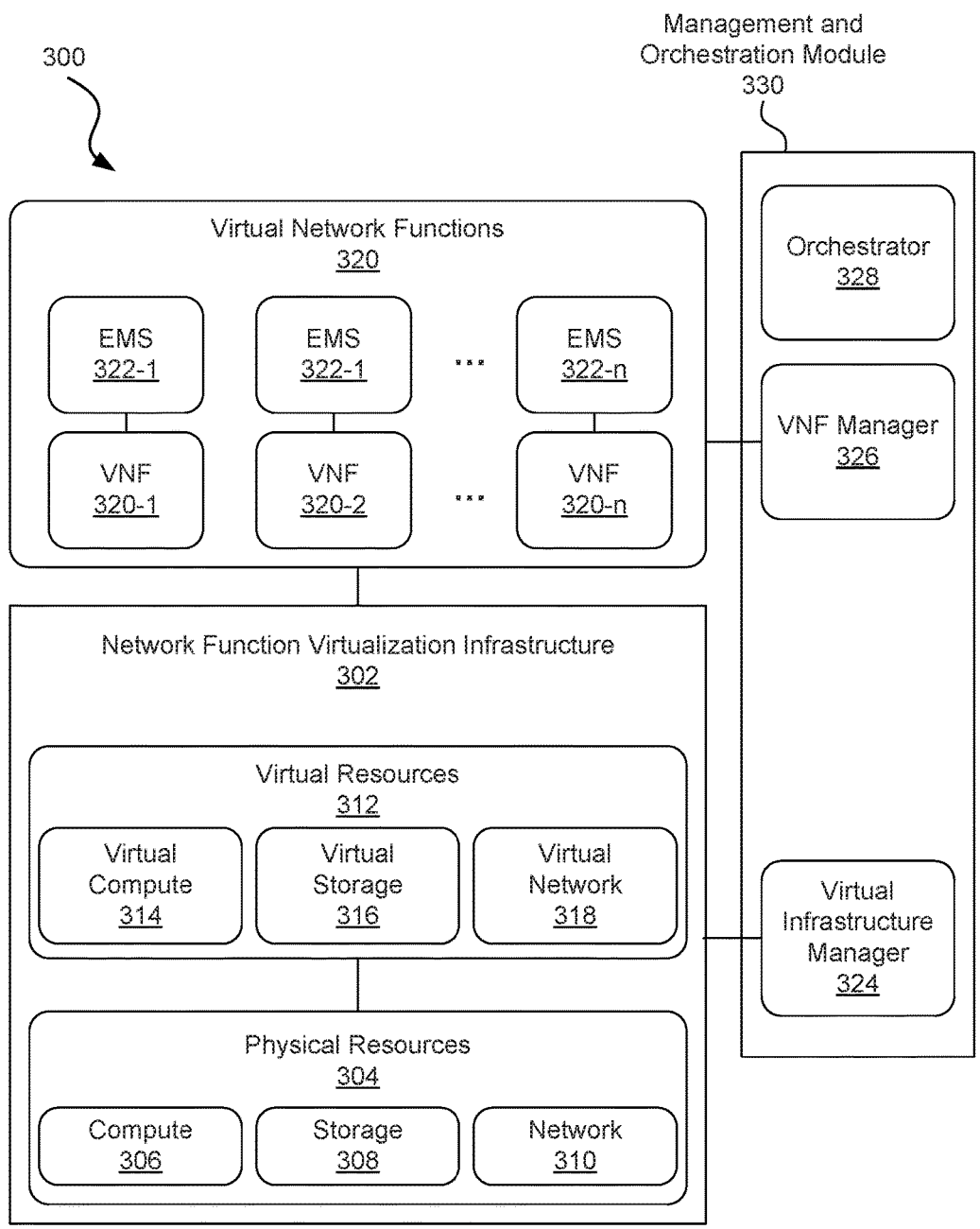
FIG. 3 is a diagram showing network function virtualization, according to one example of principles described herein.

FIG. 3 is a diagram showing an example network function virtualization 300. In some examples, the virtual containers (e.g., 110, 204) may be implemented as VNF components provisioned within a Network Function Virtualization Infrastructure (NFVI) 302. According to the present example, the NFVI 302 is used to provide network function virtualization 300. The NFVI 302 provides the infrastructure for a number of VNFs 320. Both the VNFs 320 and the NFVI 302 are managed by a management and orchestration module 330.

The NFVI 302 includes a set of physical resources 304 that are used to provide a set of virtual resources 312. The physical resources 304 include computing resources 306, storage resources 308, and network resources 310. The physical resources 304 are typically embodied as a plurality of physical computing systems, sometimes referred to as servers, within a datacenter. For example, a datacenter may include several servers that are positioned on racks and interconnected via physical network cables. Each of the servers includes a physical processor, a memory, and a network interface. Some servers may be designed primarily for processing power and some servers may be designed primarily for storage.

The computing resources 306 include a plurality of processors within a plurality of physical computing systems. The processors are designed to process machine readable instructions to perform specifically designed tasks. The processors can be designed to work together to provide parallel processing capabilities. In some examples, the processors are high performance processors such as processor 102. In other words, the processors include multiple execution units, each having its own ALU. Thus, when performing media transcoding, and other process intensive tasks, specific components of a VNF 320 may be assigned to specific execution units within the processor of the computing resources 306 as described above.

The storage resources 308 may include various types of memory. Some types of memory, such as non-volatile types of memory, typically have large storage volume but relatively slow performance. The storage resources 308 may include a series of hard disk drives or solid state drives that store data in the form of machine readable instructions as well as large amounts of data. The storage resources 308 may also include volatile forms of memory, such as those used for Random Access Memory (RAM), which are optimized for speed and are often referred to as "working memory."

The network resources 310 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 304 use hypervisors to provide a virtual computing environment that provides the virtual resources 312. Specifically, the hypervisors provide virtual hardware to guest operating systems. A physical computing system may provide one or more virtual machines for use by guest operating systems. The virtual resources 312 include virtual computing resources 314, virtual storage resources 316, and virtual network resources 318. Such virtual resources 312 may emulate their underlying physical resource counterparts.

The virtual computing resources 314 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 316 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

The virtual machines that are provided as part of the virtual resources 312 can be interconnected to each other through one or more virtual networks that make up the virtual networking resources 318. Such virtual networks emulate physical networks. The virtual networks can also isolate sets of virtual machines as desired. This can be helpful if some virtual machines are owned and/or operated by one entity and other virtual machines are owned and/or operated by another entity.

The NFVI 302 is managed by a virtual infrastructure manager 324, which is part of the management and orchestration module 330. The infrastructure manager 324 may include hardware, software, or a combination of both to perform various management functions. For example, the infrastructure manager 324 may be an application that resides on one or more physical machines and can receive input from human administrators as well as other management functions. The infrastructure manager 324 can then manage the physical and virtual environment as appropriate. For example, if it is determined that more virtual machines are desired, then the infrastructure manager 324 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 324 can also take such physical computing systems out of standby mode when more computing power is desired. One example of an infrastructure manager 324 includes the open-source cloud computing software platform provided by the Openstack Foundation under the name OpenStack™.

As described above, a VNF 320 represents a virtualization of specific telecommunication functions that were previously performed by specialized pieces of hardware. Examples of a VNF 320 include, but are not limited to, an SBC, an Internet Protocol (IP) Multimedia Subsystem (IMS) core, and a telephony application server. A VNF 320 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 320 has a corresponding Element Management System (EMS) 322. The EMS 322 includes a user interface, or a dashboard, that allows an administrator to configure the VNF 320 as desired. To provide full NFV, several VNFs work together to provide the desired services. In the present example, a plurality of VNFs 320-1, 320-2 . . . 320-*n* and corresponding EMSs 322-1, 322-2 . . . 322-*n* are used to provide NFV.

The VNFs 320 are managed by a VNF manager 326, which is part of the management and orchestration module 330. In some cases, there may be multiple VNF managers 326, each managing one or more specific VNFs 320. The VNF manager 326 can manage the VNFs based on network demand. For example, at peak times, the VNF manager 326 can start up new instances of VNF components to scale dynamically according to demand. While there may be several VNF managers 326, there is a single orchestrator 328 that manages the VNF managers 326 and thus manages the entire NFV service.

Each VNF 320 may include a number of VNF components, each component corresponding to one of the virtual containers 110 described above. In one example, the VNF 320-1 is an audio transcoding VNF. In some examples, the VNF 320-2 may be designed to perform a different type of task, such as an encryption or decryption task.

Figure 4:
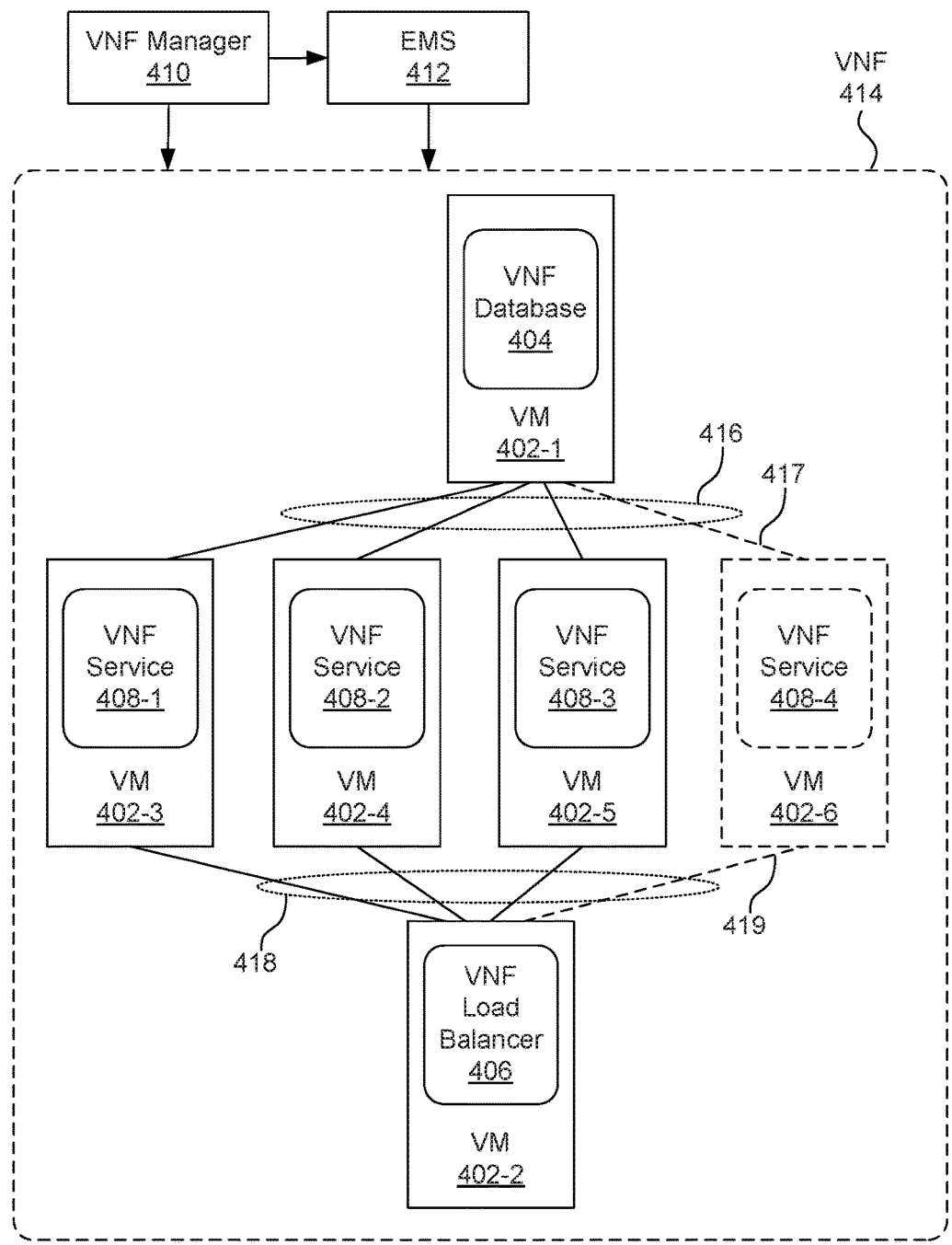
FIG. 4 is a diagram showing VNF elasticity, according to one example of principles described herein.

FIG. 4 is a diagram showing elasticity of example VNF components. According to the present example, a VNF 414 is managed by a VNF manager 410. The VNF manager 410 is in communication with an EMS 412. The VNF manager 410 corresponds to the VNF manager 326 described above. The VNF 414 includes a number of VNF components 404, 406, 408. There are different types of VNF components 404, 406, 408. Specifically, the VNF 414 includes a database component 404, a load balancer component 406, and a plurality of service components 408. Each VNF component 404, 406, 408 may run on a different virtual machine 402. The VNF components illustrated herein are examples. Other types of VNF components may be used in accordance with principles described herein.

In the present example, the database component 404 runs on virtual machine 402-1. The database component 404 stores a variety of data that is used by other VNF components. For example, the database component 404 may include subscriber related data for at least a subset of the subscribers of the telecommunication service associated with the VNF 414. While only a single database component 404 is shown, some examples may include additional database components 404. The database component 404 is connected to the service components 408 through connections 416. The connections 416 are part of a virtual network associated with the VNF 414.

In the present example, the load balancer component 406 runs on virtual machine 402-2. The load balancer component 406 balances the workload of the VNF 414 between the service component instances 408. The load balancer component 406 may also act as an access point between the core network to which the VNF 414 belongs and the access network. The access network is the part of a telecommunications network that connects a subscriber's communication device (e.g., a phone, cellular phone, or computer) to the core network. While only a single load balancer component 406 is shown, some examples may include additional load balancer components 406. The load balancer component 406 is connected to the service instances through connections 418. The connections 418 are part of the virtual network associated with the VNF 414.

In the present example, there are three service component instances 408-1, 408-2, 408-3. Service component instance 408-1 runs on virtual machine 402-3. Service component instance 408-2 runs on virtual machine 402-4. Service component instance 408-3 runs on virtual machine 402-5. The service component instances 408 perform the primary servicing functions of the VNF 414. For example, the service component instances 408 may perform the audio transcoding function. When more subscribers are using the telecommunication service associated with the VNF 414, a greater percentage of the capacity of the VNF 414 becomes fuller.

According to one example, when utilization of the VNF 414 exceeds a certain percentage of total capacity, the VNF 414 can scale to handle the additional demand for services. For example, if the VNF 414 reaches 80 percent of total capacity, the VNF 414 can start up an additional service component instance 408-4 to increase the total capacity of the VNF 414. For example, if demand for transcoding, or other processing task, exceeds a predetermined threshold, then an additional VNF component, or virtual container containing that VNF, may be provisioned. Conversely, if the utilization of capacity drops below a defined threshold, such as 50 percent, then one of the service component instances 408 can be decommissioned, thereby freeing up an execution unit to be used by other execution units.

When a new virtual machine 402-6 is created for the purpose of running a new VNF component 408-4, new connections 417, 419 are established to connect that new virtual machine 402-6 to other virtual machines 402-1, 402-2 that run other VNF components. Specifically, the new virtual machine 402-6 is connected to the virtual machines 402-1, 402-2 that run the database component 404 and the load balancer component 406. The automatic establishment of the connections 417, 419 through use of a Software Defined Networking (SDN) controller allows for the elasticity of the VNF 414 to perform more efficiently. This consumes fewer resources and thus allows the underlying physical systems to operate more efficiently.

Figure 5:
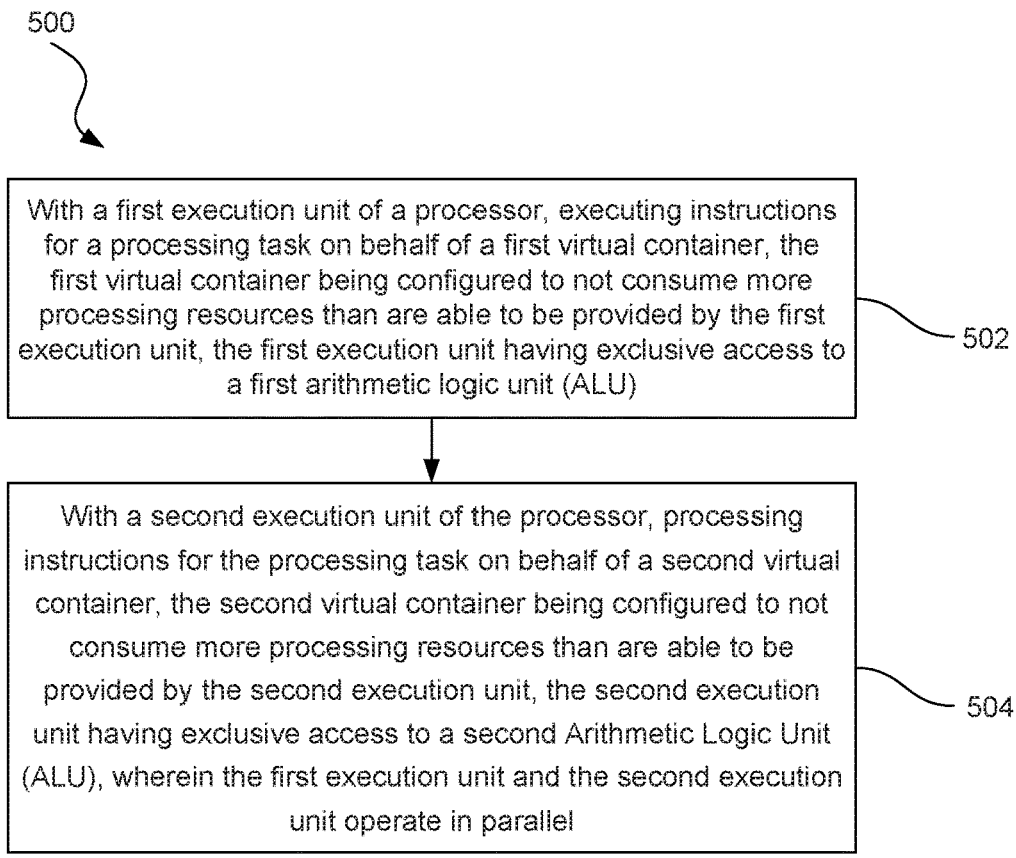
FIGS. 5 and 6 are flowcharts showing illustrative examples of methods for performing processing tasks with multiple virtual containers assigned to specific execution units, according to one example of principles described herein.

FIG. 5 is a flowchart showing an illustrative example of methods for performing processing tasks with multiple virtual containers assigned to specific execution units. According to the present example, action 502 includes, with a first execution unit (e.g., 104a, FIG. 1) of a processor (e.g., 102, FIG. 1), executing instructions for a processing task on behalf of a first virtual container (e.g., 110a, FIG. 1). The first virtual container is configured to not consume more processing resources than are able to be provided by the first execution unit. Additionally, the first execution unit has exclusive access to a first arithmetic logic unit ALU. In other words, no other execution units besides the first execution unit have access to the first ALU. Thus, the first execution unit does not have to compete for the processing resources of the first ALU.

The method 500 further includes an action 504 for, with a second execution unit (e.g., 104b, FIG. 1) of the processor, processing instructions for the processing task on behalf of a second virtual container (e.g., 110b, FIG. 1). The second virtual container is configured to not consume more processing resources than are able to be provided by the second execution unit. Additionally, the second execution unit has exclusive access to a second ALU. In other words, no other execution units besides the second execution unit have access to the second ALU. Thus, the first execution unit does not have to compete for the processing resources of the first ALU. Additionally, the first execution unit and the second execution unit operate in parallel.

The processing task may include one of several different tasks. For example, as described above, the processing task may include a transcoding task, such as an audio or video transcoding task. The processing task may also include an encryption task that encrypts audio or video data as it is being transmitted. The processing task may also include a decryption task that decrypts audio or video data as it is being received. The processing task may also include a networking task such as performing network address translation (NAT). The processing task may also be related to Real Time Transport Control Protocol (RTCP).

Figure 6:
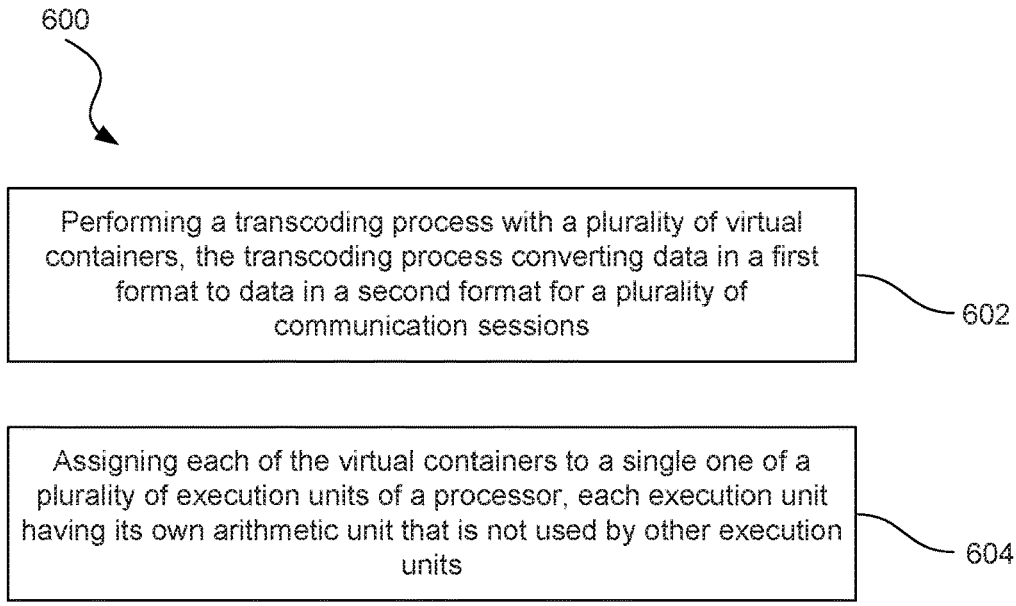

FIG. 6 is a flowchart showing an illustrative example of methods for performing processing tasks with multiple virtual containers assigned to specific execution units. According to the present example, the method 600 includes an action 602 for performing a transcoding process with a plurality of virtual containers (e.g., 110, FIG. 1). The transcoding process involves converting data in a first format to data in a second format. This transcoding process may be applied to a plurality of communication sessions being passed over a network.

According to the present example, the method 600 further includes an action 604 for assigning each of the virtual containers to a single one of a plurality of execution units of a processor (e.g., 102, FIG. 1). Each execution unit has its own arithmetic logic unit that is not used by other execution units. In other words, each execution unit has exclusive access to its own arithmetic logic unit. A virtual container that is assigned to a particular execution unit uses only that execution unit and does not rely on other execution units to which it is not assigned. The virtual container may be designed to fully utilize an execution unit without demanding more processing resources than can be provided by a single execution unit.

As described above, the processor may be a single processor that is fabricated on a single die. The processor may include a plurality of execution units. Each execution unit is able to execute instructions independently of other execution units. For example, each execution unit may have its own set of physical systems such as processor registers, ALUs, etc., which are not shared with other execution units. In other words, each execution unit has exclusive access to its own specific components such as an ALU.

Each execution unit may have multiple cores. Each processing core is capable of fetching, decoding, and executing instructions. Each instruction may or may not involve the ALU. For example, instructions such as "branch" or "move data" may not use the ALU. In some examples, instructions that involve arithmetic (e.g., add or increment) or bitwise operations (e.g., AND, OR, etc.) may use the execution unit's ALU.

Because each execution unit has its own ALU, or set of ALUs, it does not have to wait on the ALU(s) to perform tasks on behalf of other execution units. Each ALU includes a collection of logic gates that are used to perform arithmetic and bitwise and parallel register operations on binary data. Typically the ALU takes two operands from two processor registers and performs an operation on those operands. Then, the ALU places the output of the operation into another processor register. A particular execution unit may have more than one ALU. In some examples, multiple cores in a single execution unit may share the one or more ALUs within that execution unit.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   with a first execution unit of a processor, executing instructions for a processing task on behalf of a first virtual container, the first virtual container being configured to utilize computing resources of the first execution unit without demanding more computing resources than the first execution unit provides, the first execution unit having exclusive access to a first arithmetic logic unit (ALU); and
   with a second execution unit of the processor, processing instructions for the processing task on behalf of a second virtual container, the second virtual container being configured to utilize computing resources of the first execution unit without demanding more computing resources than the first execution unit provides, the second execution unit having exclusive access to a second Arithmetic Logic Unit (ALU);
   wherein the first virtual container corresponds to a first Virtual Network Function (VNF) component and the second virtual container corresponds to a second VNF component, and wherein the first execution unit and the second execution unit operate in parallel; and provisioning an additional VNF component for execution on a third execution unit of the processor, the third execution unit having exclusive access to a third ALU.

2. The method of claim 1, wherein the first execution unit and the second execution unit have Multiple Instruction Multiple Data (MIMD) capabilities.

3. The method of claim 1, wherein the first execution unit and the second execution unit have additional ALUs that are not used by other execution units.

4. The method of claim 1, wherein the processing task comprises audio transcoding for speech frames, the audio transcoding changing the speech frames from a first media format to a second media format.

5. The method of claim 1, wherein the processing task comprises:
performing an encryption process to encrypt audio or video data as it is being transmitted.

6. The method of claim 1, wherein the processing task comprises one of: processing Real Time Transport Control Protocol (RTCP).

7. The method of claim 1, wherein the first virtual container and the second virtual container are application instances run by an operating system running on the processor of a computing system.

8. A method comprising:
performing a transcoding process with a plurality of virtual containers, the transcoding process converting data in a first format to data in a second format for a plurality of communication sessions;
assigning each of the virtual containers to a single one of a plurality of execution units of a processor, each execution unit having exclusive access to its own arithmetic logic unit; and
freeing up one of the plurality of execution units in response to demand for the transcoding process dropping below a threshold level.

9. The method of claim 8, wherein the transcoding process for the plurality of communication sessions is done in parallel by different execution units.

10. The method of claim 8, wherein a particular one of the plurality of virtual containers is configured to consume less computing resources than is capable of being provided by a single one of the execution units.

11. The method of claim 8, wherein each execution unit is capable of executing Multiple Instruction Multiple Data (MIMD) instructions.

12. The method of claim 8, wherein each virtual container corresponds to a single Virtual Network Function (VNF) component.

13. The method of claim 12, further comprising, provisioning additional VNFs in response to an increase in demand for transcoding, the additional VNFs being assigned to execution units that are not currently serving other VNFs.

14. The method of claim 8, wherein each of the plurality of execution units operate in parallel.

15. A system comprising:
a processor having a plurality of independent execution units, each independent execution unit having exclusive access to at least one arithmetic logic unit; and
a memory comprising machine readable instructions that when executed by the processor, cause the system to:
perform a transcoding process from a first media format to a second media format, the transcoding process being performed by a plurality of virtual containers, each virtual container assigned to one of the plurality of independent execution units; wherein each virtual container corresponds to a single Virtual Network Function (VNF) component; and
provisioning additional VNFs in response to an increase in demand for transcoding, the additional VNFs being assigned to execution units that are not currently serving other VNFs.

16. The system of claim 15, wherein the at least one arithmetic logic unit includes vector processing capability.

17. The system of claim 15, wherein the system is further to collect data from the transcoding process with an analytics component.

* * * * *